United States Patent [19]

Boaz

[11] Patent Number: 4,761,310

[45] Date of Patent: Aug. 2, 1988

[54] METHOD OF BONDING AN OIL-BASED CERAMIC PAINT TO A SURFACE OF A GLASS SHEET

[75] Inventor: Premakaran T. Boaz, Livonia, Mich.

[73] Assignee: Ford Motor Company, Dearborn, Mich.

[21] Appl. No.: 914,851

[22] Filed: Oct. 3, 1986

[51] Int. Cl.$^4$ .............................................. B05D 3/02
[52] U.S. Cl. ...................................... 427/314; 427/378; 427/443.2
[58] Field of Search ...................... 427/389.7, 374, 165, 427/378, 372.2; 65/60.1, 60.3

[56] References Cited

U.S. PATENT DOCUMENTS

| | | | |
|---|---|---|---|
| 3,042,547 | 7/1962 | Pickett | 427/314 |
| 4,267,209 | 5/1981 | Hanson | 427/376.2 |
| 4,312,896 | 1/1982 | Armstrong | 427/376.3 |
| 4,336,279 | 6/1982 | Metzger | 427/378 |
| 4,388,347 | 6/1983 | Shum et al. | 427/376.3 |
| 4,407,847 | 10/1983 | Boaz | 427/165 |

Primary Examiner—Thurman K. Page
Assistant Examiner—L. R. Horne
Attorney, Agent, or Firm—William E. Johnson; Clifford L. Sadler

[57] ABSTRACT

This specification discloses a method of bonding an oil-based ceramic paint to a surface of a glass sheet. The method is initiated by washing the glass sheet with hot water to both clean and heat the glass sheet. Any excess water is removed from the washed glass sheet. An oil-based ceramic paint is applied to a surface of the washed glass sheet. Thereafter, the heat placed in the glass sheet by the washing operation is utilized to take part in the bonding of the ceramic paint to the surface of the glass sheet as the oil vehicle of the ceramic paint is evaporated.

4 Claims, 1 Drawing Sheet

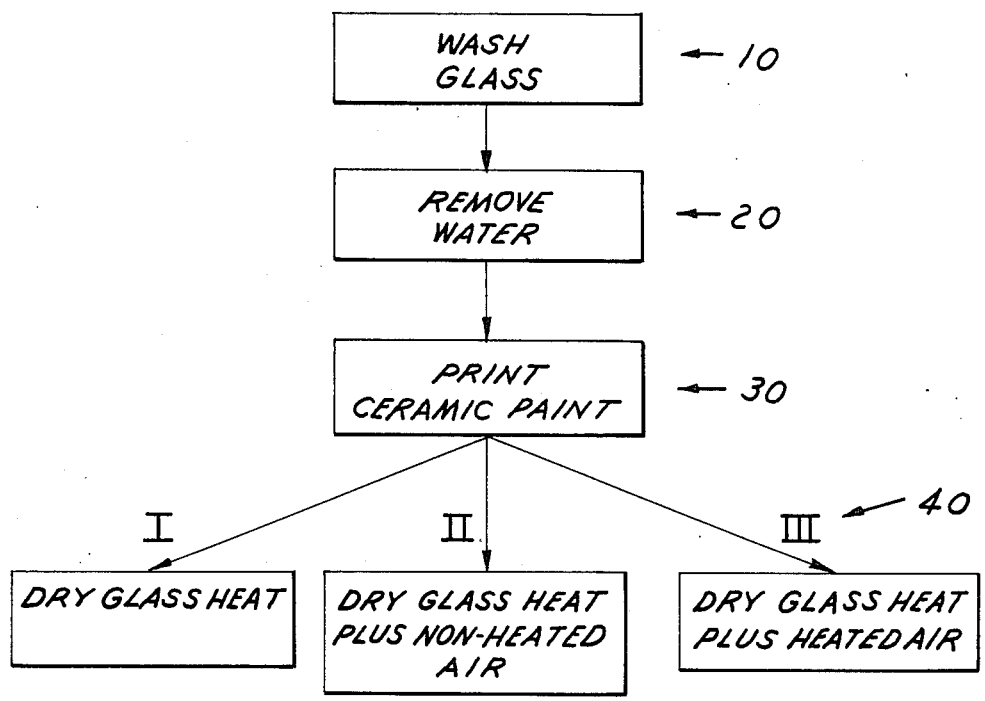

METHOD OF BONDING AN OIL-BASED CERAMIC PAINT TO A SURFACE OF A GLASS SHEET

TECHNICAL FIELD

This application is directed to a method of bonding an oil-based ceramic paint to a surface of a glass sheet. The method finds particular utility in the manufacture of vision units such as side lites and back lites for automotive vehicles. In many instances, these glass sheets have ceramic paint applied thereto for both functional and decorative purposes. The method of this invention reduces the cost of manufacture of such glass sheets having a ceramic paint thereon.

BACKGROUND AND PRIOR ART STATEMENT

No search was conducted on the subject matter of this specification in the U.S. Patent and Trademark Office or in any other search facility. I am unaware of any prior art more relevant to the subject matter of this specification than that which will be set forth hereinbelow.

Glass vision units for motor vehicles, such as side lites and back lites, have had ceramic paint applied thereto for both decorative and functional purposes. A decorative purpose would be, for example, that the model name of the vehicle be printed on a glass lite. For functional purposes, ceramic paint is printed on such glass lites for the purpose of rendering the lites opaque so that someone from the exterior of the vehicle could not view areas located beneath moldings or package trays or other types of retaining fixtures.

In the past, our Company manufactured such glass lites in the following manner. Individual glass templates, which would form the glass lite in question were cut from larger glass brackets. The individual glass templates were then carefully washed and stacked for a subsequent painting operation. At some substantial time after the washing of the glass template, the glass template was moved to a painting operation. In the painting operation, an oil-based ceramic paint was applied to a surface of the glass template. The glass template was then moved into some type of a heated chamber so that the oil vehicle of the ceramic paint would be evaporated and the ceramic paint would be at least temporarily bonded to the surface of the glass template. To install and operate the heating equipment, of course, required substantial expenditures of funds.

The glass template then had to be allowed to cool so that it once again could be handled. Additional operations would then be practiced on the glass template, for example, bending and tempering in order to form a finished side lite or back lite for a motor vehicle. During the bending and tempering operations, the cereamic paint would become fire bonded to the surface of the glass template and would not be removable therefrom under normal abrading action.

It is an object of this invention to provide a method of bonding an oil-based ceramic paint to a surface of a glass sheet which is cheaper and more economical than the prior known method. It is an additional object of this invention to provide a method of bonding an oil-based ceramic paint to a surface of a glass sheet which requires less sophisticated apparatus than heretofore required with the method described above, particularly in the step of heating the glass sheet in order to have the oil vehicle of the ceramic paint be evaporated and the ceramic paint bonded to the surface of the glass sheet.

DISCLOSURE OF INVENTION

This invention is directed to a method of bonding a ceramic paint to a surface of an article and, more particularly, to a method of bonding an oil-based ceramic paint to a surface of a glass sheet, which includes the following steps:

The glass sheet is washed with hot water to both clean and heat the glass sheet. Any excess water is removed from the washed glass sheet. An oil-based ceramic paint is applied to a surface of the washed glass sheet. Thereafter, the heat placed in the glass sheet by the washing operation is utilized to take part in the bonding of the ceramic paint to the surface of the glass sheet as the oil vehicle of the ceramic paint is evaporated.

Preferably, the method is carried out by utilizing only the heat placed in the glass sheet by the washing operation to evaporate the oil vehicles of the ceramic paint. However, this heat placed in the glass sheet by the washing operation may be used in conjunction with movement of a non-heated air stream or a heated air stream over the glass sheet to accomplish the evaporation of the oil vehicle of the ceramic paint so that the ceramic paint is bonded to the glass sheet.

As is known to those skilled in the art, additional steps are then carried out on the glass sheet having the ceramic paint thereon in order to finish its fabrication. Such additional steps as bending and tempering are employed in the manufacture of automotive side lites and back lites. Bending is normally used to put a curvature in the glass sheet so that it is aesthetically pleasing when installed in a motor vehicle.

In some cases, however, the glass sheet may not be bent but might be subjected only to a tempering operation. The heat employed in a tempering operation is sufficient to fire-bond the ceramic paint to the surface of the glass sheet so that the paint cannot be removed from that surface.

My method utilizes the heat placed in the glass sheet by the glass washing operation as a principal source of heat to evaporate the oil vehicle of the ceramic paint. In this manner, a great deal of money is saved on generating heat to dry the paint, as described above, and in equipment for the drying operation. If one does desire to use a heated air stream in conjunction with the drying operation in which the heat of the glass is utilized, then a simple air gun type device can be used rather than an elongated and relatively expensive heating chamber.

BRIEF DESCRIPTION OF THE DRAWING

The novel features of the invention that are considered characteristic are set forth with particularity in the appended claims. The invention itself, however, both as to its organization and its method of operation, together with additional objects and advantages thereof, will best be understood from the following description of specific embodiments when read in connection with the accompanied drawing in which:

FIG. 1 is a schematical representation of the steps in the method of my invention.

BEST MODE AND INDUSTRIAL APPLICABILITY

The following description is what I consider to be a preferred embodiment of my method of bonding an oil-based ceramic paint to a surface of a glass sheet. The following description also sets forth what I now contemplate to be the best mode of carrying my inventive method. The description is not intended to be a limitation upon the broader principles of the method of my invention, and, while preferred materials are used to illustrate the method of my invention in accordance with the requirements of the laws, it does not means that other materials cannot be used successfully in the method of my invention.

In FIG. 1, the steps in the method of my invention are schematically illustrated. The method is initiated by washing the glass sheet. This step is generally designated by the numeral 10. In the glass sheet washing operation, the glass is washed with hot water to both clean and heat the glass. Generally, the water is heated to a temperature in a range from 175° to 210° F., preferably 200° F. Contact between the glass sheet and the hot water is carried out for a period of time sufficient to raise the temperature of the glass sheet to a temperature in a range from 140° F. to 160° F. A small amount of detergent may be contained in the hot water for the washing operation in order to thoroughly cleanse the surface of the glass sheet.

The second step of my method generally designated by the numeral 20 in FIG. 1 is the step of removing any excess water from the washed glass sheet. Normally, this operation is carried out by use of an air knife which directs a relatively thin current of air extending across the entire width of the glass sheet and moved relative thereto to blow off any excess water. Normally, this air knife operation requires a one-to-two second time period for completion. The glass sheet retains substantially all of the heat it picked up while being washed with the hot water. This operation removes very little of the heat which has been stored within the glass sheet. The glass sheet would have a temperature in a range from about 130° F. to about 150° F. at this time.

The next step in my method is generally designated by the numeral 30 in FIG. 1. In this step, an oil-based ceramic paint is applied to the surface of the washed glass sheet. Normally, the application is carried out by means of a silk screeen printing operation in which the area for painting is removed from the silk screen so that the paint may flow therethrough to engage the surface of the glass sheet. Such silk screen printing operations are well known in the art and no further discussion thereof will be undertaken herein.

Normally, for the silk screen printing operation, an oil-based ceramic paint is utilized. As an illustration of an oil-based ceramic paint, I prefer to utilize Drakenfield 27-2247 or Ferro 3501.

The reason that ceramic paint is applied to the glass sheet is that it is desired to decorate the glass sheet or, in the alternative, provide an opaque area which screens out something that should not be seen from the exterior of the vehicle through the glass sheet. Such screening is used particularly, for example, in back lites of automobiles so that one may not view areas under the package tray or above the headliner in the motor vehicle from the exterior of the motor vehicle.

The last step in the method of my invention is generally designated by the numeral 40. This last step, however, has three optional procedures which are identified in FIG. 1 as Procedure I, Procedure II or Procedure III.

In the Procedure I, the heat placed in the glass sheet by the washing operation 20 is utlized to take part in the bonding of the ceramic paint to the surface of the glass sheet as the oil vehicle of the ceramic paint is evaporated. In this first procedure, the heat from the glass sheet alone is utilized to evaporate the oil vehicle of the ceramic paint. By a bonding of the ceramic paint to the glass sheet, I mean the bonding achieved by the dried organic binders such as the rosin in a pine oil based vehicle. This, of course, is the most economical way of utilizing the method of my invention, because the heat required for drying the ceramic paint is already present in the glass sheet. No other supplemental form of energy is required in the drying operation, and therefore the costs are zero, other than the cost involved in washing the glass sheet in order to both clean and heat the same.

In Procedure II, the oil vehicle of the ceramic paint is evaporated by both the heat placed in the glass sheet by the washing operation and by movement of a non-heated air stream thereover. By a non-heated air stream, I mean simply room temperature air which is blown over the glass sheet. Movement of the air over the glass sheet draws the heat from the glass sheet to the surface at a more rapid rate, thus providing a more rapid evaporation of the oil vehicle of the ceramic paint. Thus, the bonding of the oil-based ceramic paint to a surface of the glass sheet is accomplished more rapidly than in Procedure I when no air is moved over the glass sheet.

In Procedure III, the oil vehicle of the ceramic paint is evaporated by both the heat placed in the glass sheet by the washing operation and by movement of a heated air stream over the glass sheet. Normally, I would recommend that the air for a heated air operation be heated to a temperature in a range from 250° F. to 300° F. This once again speeds the entire drying process without the addition of complex drying equipment. A simple heated air gun, much like a commercial hair dryer, can be utilized rather than an elongated drying tunnel.

Normally in the manufacture of glass sheets for sides lites and back lites for a motor vehicle, there is additional processing carried out on each individual lite. Normally, the additional processing includes steps of bending and tempering the glass sheet, as is well known in the art. These normal glass sheet processing steps are well known to a skilled artisan so no further discussion thereof will be undertaken herein. During the bending and tempering operations, the ceramic paint will be permanently bonded to the glass surface on which it sits so that in actual use, the ceramic paint will not be scrapped off or removed from the glass surface.

While particular emodiments of the method of my invention have been illustrated and described, it will be ovbious to those skilled in the art that various changes and modifications may be made without departing from the invention. It is intended to cover in the appended claims all such modifications and equivalents as fall within the true spirit and scope of this invention.

I claim:

1. A method of bonding an oil-based ceramic paint to a surface of a glass sheet consisting essentially of the steps of:

washing the glass sheet with hot water to both clean and heat the glass sheet;

removing any excess water from the washed glass sheet;

applying an oil-based ceramic paint to a surface of the washed glass sheet; and utilizing said heat placed in the glass sheet by said washing operation as a principal heat source the bonding of the ceramic paint to the surface of the glass sheet as the volatiles in the oil vehicle of the ceramic paint are evaporated.

2. The method of claim 1, wherein: said volatiles in the oil vehicle of the ceramic paint are evaporated only by the heat placed in the glass sheet by said washing operation.

3. The method of claim 1, wherein: said volatiles in the oil vehicle of the ceramic paint are evaporated by both heat placed in the glass sheet by said washing operation and by movement of a non-heated air stream thereover.

4. The method of claim 1, wherein: said volatiles in the oil vehicle of the ceramic paint are evaporated by both heat placed in the glass sheet by said washing operation and by movement of a heated air stream thereover.

* * * * *